United States Patent [19]

Ross et al.

[11] Patent Number: 4,541,037

[45] Date of Patent: Sep. 10, 1985

[54] ALUMINUM ELECTROLYTIC CAPACITOR

[75] Inventors: Sidney D. Ross, Williamstown; Manuel Finkelstein, North Adams, both of Mass.

[73] Assignee: Sprague Electric Company, North Adams, Mass.

[21] Appl. No.: 662,757

[22] Filed: Oct. 19, 1984

[51] Int. Cl.³ .............................................. H01G 9/02
[52] U.S. Cl. .................................... 361/433; 252/62.2
[58] Field of Search .......................... 361/433; 29/570; 252/62.2

[56] References Cited

U.S. PATENT DOCUMENTS

| | | | |
|---|---|---|---|
| 3,300,693 | 1/1967 | Ross et al. | 317/230 |
| 3,624,459 | 11/1971 | Brown et al. | 317/230 |
| 4,373,177 | 2/1983 | Finkelstein et al. | 361/433 |
| 4,476,517 | 10/1984 | Fresia | 361/433 X |

FOREIGN PATENT DOCUMENTS

| | | |
|---|---|---|
| 984737 | 3/1965 | United Kingdom . |
| 1142989 | 2/1969 | United Kingdom . |

*Primary Examiner*—L. T. Hix
*Assistant Examiner*—Douglas S. Lee

[57] ABSTRACT

An aluminum electrolytic capacitor has a capacitor section of two aluminum electrode foils, at least one of which bears a barrier layer anodic oxide, wound with interleaved spacer material in contact with an electrolyte containing a phosphate salt, the cation of which is compatible with the cation of the electrolyte solute to prevent precipitation of a phosphate.

5 Claims, 2 Drawing Figures

ALUMINUM ELECTROLYTIC CAPACITOR

BACKGROUND OF THE INVENTION

This invention pertains to an aluminum electrolytic capacitor utilizing an electrolyte containing a phosphate salt, the cation of which is compatible with the cation of the electrolyte solute. More specifically, the invention pertains to the use of lower alkyl- and heterocyclic-substituted ammonium dihydrogen phosphates in electrolytes utilizing other than ammonium salts as solutes.

The role of added phosphate on the working electrolytes of aluminum electrolytic capacitors is poorly understood and has been confusing. One rule of thumb had it that phosphate additions were desirable in low voltage electrolytes but undesirable and voltage-limiting in the working electrolytes of high voltage (greater than 200V) electrolytic capacitors. Nevertheless, it is a common, well-established practice in the electrolytic capacitor art to add small amounts (0.1–0.2%) of ammonium dihydrogen phosphate to all glycol borate electrolytes, whether designed for either high (above 200V) or low (below 200V) voltage applications. The phosphate is added to ensure the continued passivation of the cathode foil and protect it against hydration. Hydration is accompanied by copious hydrogen gas evolution, and the disruptive effect of this gas evolution is a frequent cause of capacitor failure.

The service requirements for electrolytic capacitors have been continuously increasing in severity, and the level of protection afforded by 0.1–0.2% ammonium dihydrogen phosphate is proving to be inadequate. Moreover, there is a growing body of evidence that indicates that the presence of a phosphate in the electrolyte also helps to stabilize the oxide film on the anode. The stabilization manifests itself in low leakage current levels, but the mechanism by which this is achieved is not presently understood. For this function, as well, higher phosphate concentrations are desirable.

Experience indicates that increasing the ammonium dihydrogen phosphate concentration to 0.5% is definitely beneficial, and it may be desirable to increase the concentration to 1.0% or even higher. However, at 25° C. the limit of solubility of ammonium dihydrogen phosphate in glycol is close to 1.0%, and, in the typical glycol-based electrolyte with its high solute content, the solubility limit is very much lower. In a glycol-borate electrolyte which contains 82.5% by wt. glycol, 17.0% by wt. ammonium pentaborate and 0.5% by wt. ammonium dihydrogen phosphate, it is possible to incorporate the 0.5% ammonium dihydrogen phosphate, but this amount of phosphate is extremely difficult to dissolve, and this concentration level is extremely difficult to maintain in production.

In the other electrolyte solvents, e.g., N,N'-dimethylformamide (DMF), N-methylpyrrolidinone (NMP) and butyrolactone (BLO), the problem becomes even more acute. In all these solvents, ammonium dihydrogen phosphate is almost completely insoluble. Yet, there is an equivalent need for incorporating a phosphate salt in electrolytes utilizing these solvents alone or mixed with each other or with glycol.

The problem is further exacerbated for high voltage electrolytes which incorporate nitro compounds as depolarizers. As we have shown in our copending patent application on such high voltage electrolytes, filed concurrently, the amount of depolarizer, e.g., p-nitrobenzoic acid, that can be added without seriously lowering the maximum anodization voltage, Vmax, is determined by the amount of phosphate that is added. For long-life, high-voltage capacitors free of gas formation, it may be desirable to add as much as 5% or more of the phosphate. There is no conceivable way to do this with ammonium dihydrogen phosphate even in glycol, and in other solvents or solvent mixtures the prospects are even more dismal.

SUMMARY OF THE INVENTION

It is a feature of this invention to provide an aluminum electrolytic capacitor utilizing an electrolyte containing higher levels of phosphate than have heretofore been possible. This is achieved by using substituted-ammonium dihydrogen phosphates instead of the ammonium salt. The specific substituted-ammonium dihydrogen phosphates which were prepared and found useful are the dimethylammonium, diethylammonium, isopropylammonium, diisopropylammonium, n-butylammonium, triethylammonium, tri-n-propylammonium, and morpholinium dihydrogen phosphates.

The dimethylammonium dihydrogen phosphate may be prepared by heating a solution of phosphoric acid and dimethylformamide at 125° C. for 24 hours. Alternatively, it and the other phosphates, except the triethylammonium and diisopropylammonium salts, may be prepared by neutralizing an aqueous solution of phosphoric acid with the appropriate amine, taking the resulting salt solution to dryness at the waterpump, and crystallizing the crude products from methanol-ether or isopropanol-ether.

To prepare the triethylammonium and diisopropylammonium salts, an excess of amine (as much as three molar equivalents) must be added, and then a large volume of ether, to the isopropanol solution of concentrated phosphoric acid as above.

Unlike ammonium dihydrogen phosphate, all of these substituted-ammonium dihydrogen phosphates are easily soluble in glycol. With each phosphate, it is possible to obtain a glycol solution which at room temperature contains 10 or more grams of the phosphate per 100 ml of glycol. The dimethylammonium dihydrogen phosphate, which crystallizes in long needles, dissolves the most slowly, but it can still provide a solution containing 10 g per 100 ml of glycol.

In dimethylformamide, DMF, only the triethylammonium dihydrogen phosphate and the tri-n-propylammonium dihydrogen phosphate provide useful levels of solubility, and all the other phosphates are almost completely insoluble. The triethylammonium salt is soluble at 25° C. at the level of 1 g in 100 ml of DMF, but in the same solvent volume 1.5 g is not completely soluble. The tri-n-propylammonium salt is unexpectedly soluble, and solutions containing 10 g or more of this salt in 100 ml of DMF at 25° C. are easily obtainable.

In butyrolactone, only the above two phosphates provide useful levels of solubility. The tri-n-propylammonium is again soluble to a level greater than 10 g/100 ml, and the triethylammonium dihydrogen phosphate provides a solubility level higher than 5 g/100 ml but lower than 8 g/100 ml.

In N-methylpyrrolidinone, even the triethylammonium dihydrogen phosphate is not adequately soluble, the observed solubility being slightly less than 0.5 g/100 ml of solvent. Nevertheless, the tri-n-propylammonium salt was again readily soluble, providing solubilities only slightly lower than 10 g/100 ml of solvent.

There are limitations on the use of these alkylammonium dihydrogen phosphates in electrolytes for aluminum electrolytic capacitors. Specifically, the cation of the electrolyte solute must be compatible with the cation of the added phosphate. This means the cation of the solute and that of the phosphate must have similar solubility product constant, Ksp, values when combined with the dihydrogen phosphate anion.

Since the least soluble anion is the dihydrogen phosphate anion, the cations present in the electrolyte components must be chosen to maximize solubility and to give the largest solubility product with the dihydrogen phosphate. The discussion below involves the use of the same cation in the electrolyte solute and the phosphate. However, different cations may be used providing that both have large solubility products when combined with the phosphate.

Consider the extreme case where the electrolyte is a concentrated solution of ammonium adipate in glycol, and the phosphate is added as tri-n-propylammonium dihydrogen phosphate. Because this phosphate is very soluble (greater than 10 g/100 ml of glycol), it will dissolve readily. This can be an advantage and may be reason enough for using the very soluble tri-n-propylammonium dihydrogen phosphate since it assures that final electrolyte solution will contain the maximum possible amount of a soluble phosphate salt. However, the amount of phosphate salt that will remain in solution will be determined by the solubility product for ammonium dihydrogen phosphate and not by the solubility product for tri-n-propylammonium dihydrogen phosphate. The maximum amount of soluble phosphate will probably be greater than 0.5% but less than 1.0%. On the other hand, by using tri-n-propylammonium adipate as the electrolyte solute and tri-n-propylammonium dihydrogen phosphate as the added phosphate, it will be possible to introduce much larger concentrations (perhaps as high as 10%) of phosphate in the electrolyte system.

One simplification in the use of these alkylammonium dihydrogen phosphates in electrolytes may be mentioned. In cases where the additional water introduced in the electrolyte is not deleterious, one can introduce the phosphate into the electrolyte by adding the desired amount of the amine, e.g., triethylamine or tri-n-propylamine, and then just exactly one equivalent of concentrated (usually 87%) phosphoric acid. This obviates the need to synthesize and purify the phosphate salt, but does introduce the additional water with the phosphoric acid.

DESCRIPTION OF THE PREFERRED EMBODIMENT

Figure 1:
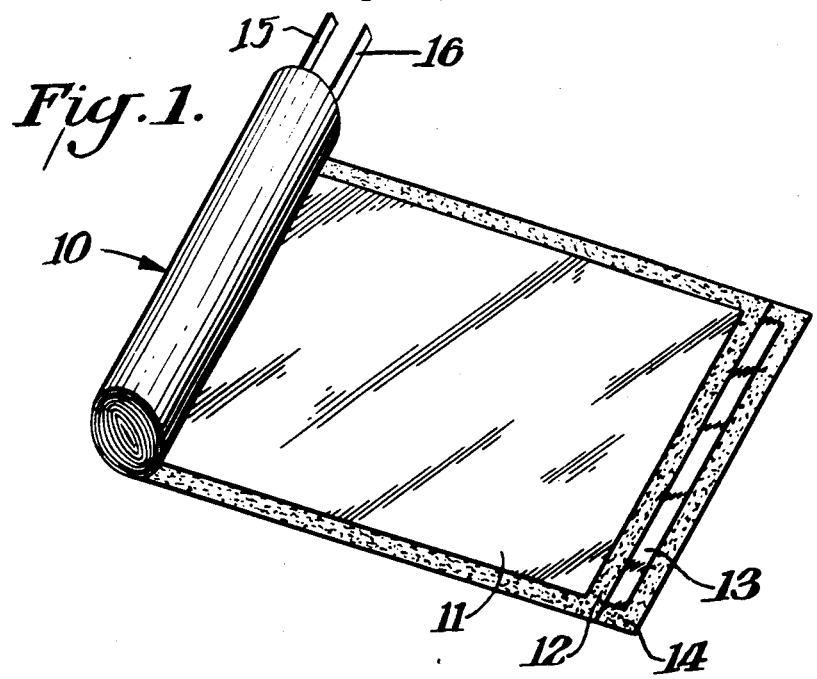
FIG. 1 is a view of a capacitor section partially unrolled.

An electrolytic capacitor section 10 has an aluminum foil anode 11 which bears a barrier layer of anodic oxide and an aluminum foil cathode 13, which may bear a dielectric oxide layer, wound with interleaved spacer material 12, 14. Electrode tab 15 is attached to anode foil 11 and tab 16 to cathode foil 13. Tabs 15 and 16 may extend from the same side of the section as shown in FIG. 1 or opposite sides as shown in FIG. 2.

Figure 2:
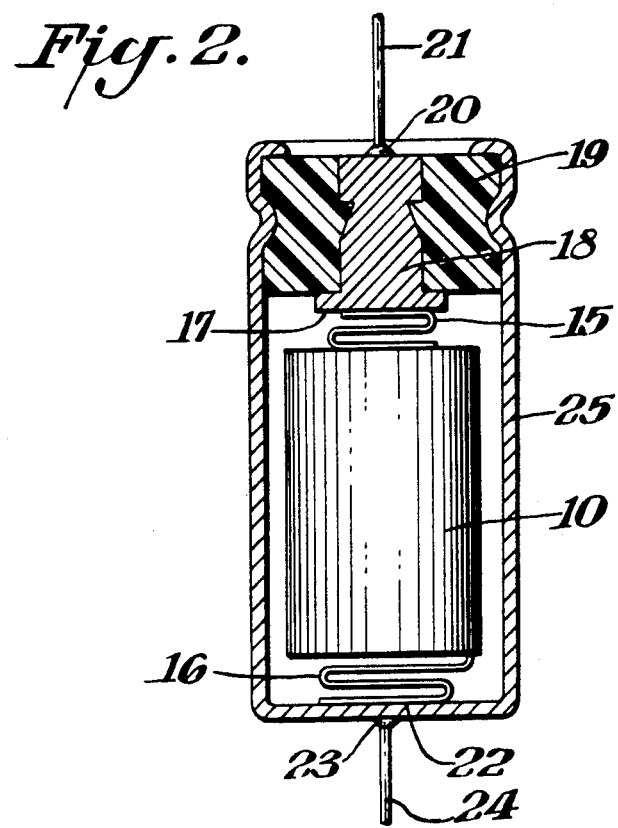
FIG. 2 is a cross-section of a finished capacitor.

In FIG. 2, section 10 is located in housing 25, preferably an aluminum can, and cathode tab 16 is connected, preferably by a weld, at 22 to the interior of the bottom of can 25. Anode tab 15 is connected to the bottom 17 of metal terminal insert 18, preferably by a weld. Insert 18 passes through a plastic or elastomeric insulating gasket or bung 19, and external anode lead 21 is affixed to the exterior upper surface of insert 18 via weld 20. Similarly, external cathode lead 24 is affixed to the exterior bottom surface of can 25 via weld 23. Capacitor section 10 is impregnated with electrolyte containing a substituted-ammonium dihydrogen phosphate having a cation compatible with the cation of the electrolyte solute.

By compatible, it is meant that both the cation of the solute(s) and that of the dihydrogen phosphate have a solubility product constant, when combined with the dihydrogen phosphate anion, large enough so that any combination of them will be soluble and hence, the phosphate will stay in solution.

Since for practical purposes the phosphate level will be greater than 0.5 wt% and at most 5 wt% (although some of the phosphates are soluble enough that 10 wt% is possible), the use of an ammonium salt as solute is precluded. Otherwise, the ammonium cation of the solute will combine with the dihydrogen phosphate anion and precipitate as the product of their concentrations will exceed the solubility product constant for ammonium dihydrogen phosphate.

EXAMPLE 1

This example gives representative data for two of the soluble phosphates added to an electrolyte containing 13% triethylammonium dodecanedioate as solute, a mixture of 42% ethylene glycol and 38% N-methylpyrrolidinone as solvent, 4% water, and 3% p-nitrobenzoic acid as depolarizer. The phosphates are triethylammonium dihydrogen phosphate (TEP), in which the cation is the same as that of the solute, and tri-n-propylammonium dihydrogen phosphate (TPP), in which the cation is different than that of the solute. The amount of added phosphate is given in weight percent, resistivity at 25° C. in ohm-cm, and maximum anodization voltage, Vmax, at 85° C. in volts.

TABLE 1

| TEP | TPP | Ω-cm | Vmax |
| --- | --- | --- | --- |
| 0.5 | — | 919 | 300 |
| 1.5 | — | 912 | 405 |
| 2.5 | — | 907 | 415 |
| 3.4 | — | 905 | 418 |
| 4.8 | — | 901 | 413 |
| — | 1.0 | 937 | 325 |
| — | 2.9 | 983 | 425 |
| — | 4.8 | 1026 | 425 |

The resistivity of the electrolyte without phosphate was 914 Ω-cm and Vmax was 235V. Both phosphates improved Vmax. The other phosphates, the isopropylammonium, the n-butylammonium, the dimethylammonium, the diethylammonium, the diisopropylammonium, and the morpholinium dihydrogen phosphate would behave in a similar fashion.

What is claimed is:

1. An aluminum electrolytic capacitor comprising a rolled capacitor section having two electrode foils, one being an anode foil bearing a dielectric oxide and the second being a cathode foil, wound with interleaved spacer material and in contact with an electrolyte having solute dissolved in an organic solvent and containing as additive a soluble, substituted-ammonium dihydrogen phosphate having a cation selected from the group consisting of isopropylammonium, n-butylammonium, dimethylammonium, diethylammonium, diisopropylammonium, triethylammonium, tri-n-propylammonium, and morpholinium cations, said solute having a cation compatible with said phosphate cation.

2. A capacitor according to claim 1 wherein up to 5 wt% of said phosphate is used.

3. A capacitor according to claim 1 wherein said phosphate is triethylammonium dihydrogen phosphate.

4. A capacitor according to claim 1 wherein said phosphate is tri-n-propylammonium dihydrogen phosphate.

5. A capacitor according to claim 1 wherein said solvent is selected from the group consisting of ethylene glycol, dimethylformamide, N-methylpyrrolidinone, butyrolactone, and mixtures thereof.

* * * * *